United States Patent [19]
Yasukawa et al.

[11] 3,801,443
[45] Apr. 2, 1974

[54] PRESSURE TUBE TYPE HEAVY-WATER MODERATED POWER REACTOR WITH BOILING LIGHT WATER COOLANT

[76] Inventors: Shigeru Yasukawa, 1267-5, Oaza Muramatsu; Wataru Shinoda, 2116-18, Oaza Muramatsu; Ryuichi Shindo; Yoshihiro Tadokoro, both of 945, Oaza Muramatsu; Toko Seya, 1088 Sugi, Naka-machi; Susumu Mitake, 138, Oaza Muramatsu; Taketoshi Arai, 138, Oaza Muramatsu; Mitsumasa Hirano, 138, Oaza Muramatsu; Sadao Sato, 2116-1, Oaza Muramatsu, all of Tokaimura, Naka-gun, Ibaragi-ken; Sadamu Sawai, 3-27-4, Shirasagi, Nakano-ku, Tokyo, all of Japan

[22] Filed: July 26, 1971

[21] Appl. No.: 166,029

Related U.S. Application Data

[63] Continuation-in-part of Ser. No. 802,113, Feb. 25, 1969, abandoned.

[52] U.S. Cl. .................................. 176/30, 176/51
[51] Int. Cl. ............................................. G21c 19/00
[58] Field of Search ............. 176/30, 31, 32, 51, 53, 176/54, 55, 87, 68

[56] References Cited
UNITED STATES PATENTS

| | | | |
|---|---|---|---|
| 3,372,093 | 3/1968 | Wikhammer et al. ................. | 176/54 |
| 3,208,915 | 9/1965 | Campbell et al. ..................... | 176/31 |
| 3,336,201 | 8/1967 | Graham et al. ........................ | 176/30 |
| 3,349,004 | 10/1967 | Lass et al. ............................. | 176/87 X |
| 3,309,277 | 3/1967 | Jaye et al. ............................. | 176/30 X |
| 3,179,571 | 4/1965 | Schabert et al. ....................... | 176/68 |

Primary Examiner—Carl D. Quarforth
Assistant Examiner—E. E. Lehmann
Attorney, Agent, or Firm—Kurt Kelman

[57] ABSTRACT

On the first fuel loading, fuel clusters each being composed of fuel elements with slightly enriched uranium dioxide are inserted in the respective pressure tube of a heavy-water moderated reactor with boiling light-water coolant, and on and after the second loading, fuel clusters each being composed of fuel elements of natural uranium dioxide mixed with plutonium dioxide which is the by-product fuel obtained from the spent fuel of the firstly loaded slightly enriched uranium dioxide fuel, are inserted in the same respective pressure tubes of a heavy water moderated reactor with boiling light water coolant, the diameter of respective fuel rods being smaller than that of the firstly loaded fuel and the number of said fuel rod in a cluster being the same as that of the firstly loaded fuel cluster. The core structure of the nuclear reactor, except the fuel cladding tube, is not changed throughout the continuous operation of said reactor. When the number of the fuel rods in the respective clusters of the reactor on and after the second loading is made larger than the number of the first loading fuel rods in the clusters and when the increased number is properly selected, the channel power output of the reactor is increased significantly.

3 Claims, 4 Drawing Figures

PRESSURE TUBE TYPE HEAVY-WATER MODERATED POWER REACTOR WITH BOILING LIGHT WATER COOLANT

This application for U.S. Letters Patent is a continuation-in-part of application Ser. No. 802,113, filed Feb. 25, 1969, now abandoned.

BACKGROUND OF THE INVENTION

The present invention relates, generally, to an advanced thermal nuclear reactor, and, in particular, to a pressure-tube type heavy-water moderated nuclear reactor with boiling light-water coolant of such kind.

The pressure-tube type heavy-water moderated reactors are known in which only slightly enriched uranium dioxide or natural uranium dioxide are used as their fuel materials and the diameter of each fuel rod is between about 15 millimeters and 18 millimeters. Among such conventional reactors, one typical example is a nuclear reactor using only slightly enriched uranium dioxide fuel pellets each having a diameter of about 15 millimeters, having a core with dimensions of about 3 meters in diameter and about 3 meters in height and using zirconium alloy (zircaloy) as the structural material, which structure includes fuel cladding tubes, pressure tubes and calandria tubes, etc. It is known that this conventional reactor has the about 10 percent outlet steam quality, and slightly positive void reactivity which is representative of a slightly increasing rate of multiplication factor when the coolant density is decreased gradually, so that such reactor can be said that it is relatively easy to be controlled and thus relatively safe while the economical feature in continuous operation of the reactor is relatively worse because considerably expensive fuel such as enriched uranium dioxide must be used in it even on and after the second loading of the fuel.

On the other hand, the reactor using natural uranium dioxide pellets as fuel in almost the same conditioned reactor as that using enriched uranium dioxide previously described, which natural uranium dioxide pellets have a diameter between 17 and 18 millimeters, it is known that the steam quality must be increased to be about 30 per cent to obtain the same economical advantage as that obtained in the reactor employing slightly enriched uranium dioxide. However, since the natural uranium loaded reactor has large positive void reactivity, the problem of the reactivity control becomes very severe and the safety characteristics of this reactor may be inferior to that of the slightly enriched uranium reactor.

Thus, from the standpoint of reactor safety, the reactor employing slightly enriched uranium dioxide fuel is desired. On the other hand, from the standpoint of fuel economy, the heavy-water moderated reactor employing natural uranium dioxide fuel has been developed in many countries because of the facility of obtaining the fuel material in world markets. When it is desired that such kind of reactor is operated continuously, the use of the relatively unexpensive fuel on and after the second fuel loading into the core is very significant for the fuel economy and thus for the power generation economy.

Furthermore, if upon the use of such unexpensive fuel material the power output of the reactor can be increased significantly, for example, 20 percent or more, it is most desirable for the economy and if such increase in the power output is utilized for the reduction of the size of the core, it will effectively attribute to the attainment of increasing the power economy.

Therefore, the object of the present invention is to provide a nuclear reactor which is of the pressure-tube type, heavy-water moderated power reactor with boiling light-water coolant which has improved inherent safe operational characteristics.

Another object of the present invention is to provide a nuclear reactor of the said type, which is capable of attaining a high thermal efficiency.

A further object of the present invention is to provide a nuclear reactor of the said type, which reactor is economical in continuous operation in comparison with the conventional reactors.

A further object of the present invention is to provide a nuclear reactor of the said type, which can provide a significant increase of the channel power output without any change in the core structure on and after the second loading of the nuclear fuel.

BRIEF DESCRIPTION OF THE DRAWINGS

This invention will be better understood from the following descriptions of an embodiment of the present invention accompanied with the attached drawings, in which.

DESCRIPTION OF THE PREFERRED EMBODIMENT

Figure 1:
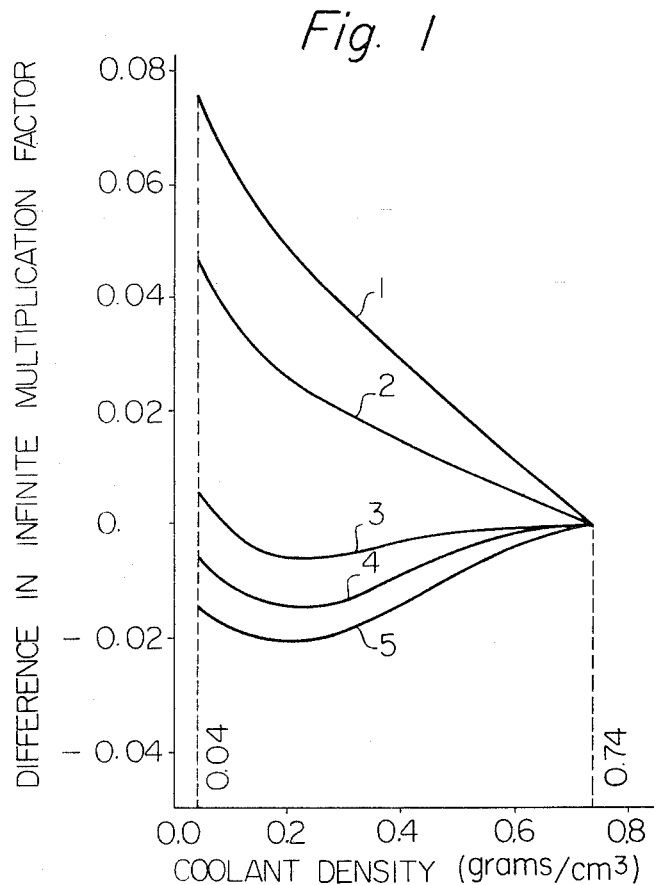
FIG. 1 illustrates the void reactivities of the reactor with various fuel loadings of the present invention in comparison to similar reactors employing conventional fuel materials.

In FIG. 1, the curve 1 is a plot of the void reactivity of a conventional pressure-tube type heavy-water moderated reactor using natural uranium dioxide fuel. The curve 2 is a plot of the void reactivity of the reactor of the said type using slightly enriched uranium dioxide fuel and the curve 5 is for the case where plutonium produced from the slightly enriched uranium dioxide is used in the same reactor.

As it will be clear from these curves, when natural uranium dioxide fuel only is employed as fuel material in the said reactor, it has the large positive void reactivity, so that the multiplication factor increase at a very high rate for a decrease in the coolant density, and the amount of the multiplication factor to be controlled becomes so large that it becomes relatively difficult to maintain the reactivity of this reactor at a predetermined safety level. In comparison with the curve 1, the curve 2 also shows positive void reactivity; however the rate of increase is relatively small, so that the amount of reactivity to be controlled is relatively small.

The nuclear reactor of the present invention utilizes slightly enriched uranium dioxide as its first fuel loading to obtain a relatively low order positive void reactivity and, on and after the second fuel loading, natural uranium dioxide mixed with plutonium dioxide, which is the by-product of the previous core loading, is used.

If slightly enriched uranium dioxide is used as the first fuel loading, the reactor lattice must be designed to be undermoderated because of suppressing positive void reactivity. In this case, however, there arises some defect in fuel burn-up. On the other hand, if plutonium dioxide bearing fuel is used, the positive void reactivity is much reduced so that a relatively well moderated lattice is possible. This provides a good advantage in fuel burn-up. The following two methods may be used for setting up a well moderated lattice: (i) increasing the lattice pitch, (ii) decreasing the fuel rod diameter. The first method cannot be used without changing the core structure, and it is not practical. The second method is useful only to provide a practical continuous refueling.

In the present invention, the above difficulties are eliminated by means that the diameter of the respective fuel rods to be loaded on and after the second loading is made such that the diameter of each rod is somewhat smaller than that of the first loaded fuel rods with slightly enriched uranium dioxide.

The curve 3 and 4 in FIG. 1 define the upper and lower limits of the void reactivities obtained on and after the second fuel loading in which the fuel is natural uranium dioxide mixed with plutonium dioxide which is the by-product of the previous core loading. As will be clear from FIG. 1, the void reactivity shown in the curve 3 and 4 is negative, and so the reactivity control for these cases is easy in comparison with the cases shown in the curve 1 and 2.

The following table shows the data obtained using a reactor of the pressure-tube type heavy-water moderated one.

A. On first fuel loading
  a. fuel material: slightly enriched uranium dioxide fuel pellet diameter: 15 millimeters
    cladding tube material: Zircaloy- 2
  b. core structure:
    inner diameter of the cladding tube: 15.20 millimeters
    outer diameter of the cladding tube: 16.66 millimeters
    spacing between the fuel rods: 2.00 millimeters
    number of fuel rods in a cluster: 28 rods
    gap distance between the fuel cluster and the pressure tube: 1.15 millimeters
    inner diameter of the pressure tube: 116.37 millimeters
    outer diameter of the pressure tube: 122.33 millimeters
    inner diameter of the calandria tube: 132.33 millimeters
    outer diameter of the calandria tube: 135.03 millimeters B. On and after second fuel loading
  a. fuel material: natural uranium dioxide mixed with plutonium dioxide
    diameter of fuel pellet: 12 – 13 millimeters
  b. core structure: same as case (A) (except the design of the cladding tube)
  c. steam quality: 15 percent As will be clear from the above data, the core structure on and after the second fuel loading may be substantially the same as that on the first loading. Therefore, on the second fuel loading it can be considered that all the conditions of the present reactor except the fuel material and the fuel loading method are the same as with a conventional reactor. Under these conditions, the present reactor has substantially higher thermal efficiency than a conventional reactor using slightly enriched uranium dioxide and is more safe than those conventional reactors using either natural uranium dioxide or slightly enriched uranium.

Briefly, the present reactor uses initially slightly enriched uranium dioxide and, without any change in the core constructures, natural uranium dioxide mixed with plutonium dioxide which is the by-product fuel from the initial core loading is loaded as its fuel on and after the secondary loading, in which the mixed oxide fuel pellets have a somewhat smaller diameter than the fuel pellets of slightly enriched uranium dioxide of the initial core. Thus, the extremely useful characteristics of the reactor, which cannot be obtained by conventional reactors of such type, is obtained. That is, where the present loading method of the fuel to the reactor core of this type is employed, the amount of the reactivity to be controlled is considerably reduced, the burn-up of the fuel is enhanced and, further steam condition, that is, the ratio of the weight for steam to saturated water at the outlet, can also be raised during continuous operation, in comparison with conventional reactors. Moreover, according to the present invention the use of large amounts of expensive enriched uranium dioxide fuel is avoided and no change in the design of the reactor core is necessary. Further, the coolant pressure loss is minimized and the burn-out margin for the cladding tubes is improved i.e., the case with which the cladding tube burns out is reduced.

The foregoings are described for the case where the number of fuel rods in each secondary loaded fuel cluster is the same as that in the initially loaded fuel cluster.

Figure 2:
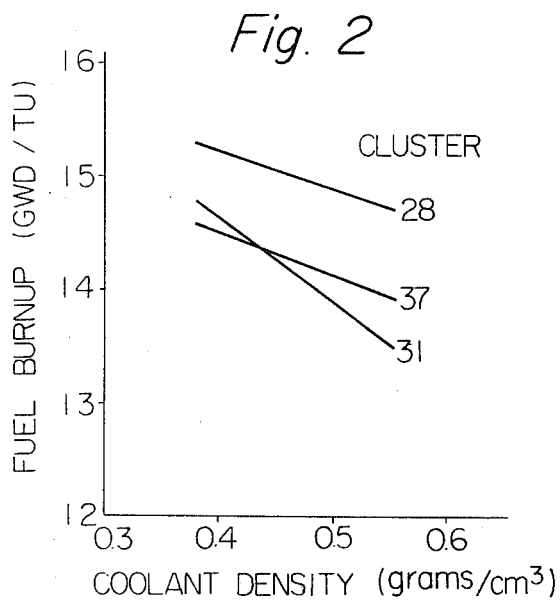
FIG. 2 illustrates the burn-up characteristics of the reactor using plutonium mixed dioxide fuel with natural uranium base, which is the present invention, and the number of the fuel rods in a cluster is parametrically presented.
Figure 3:
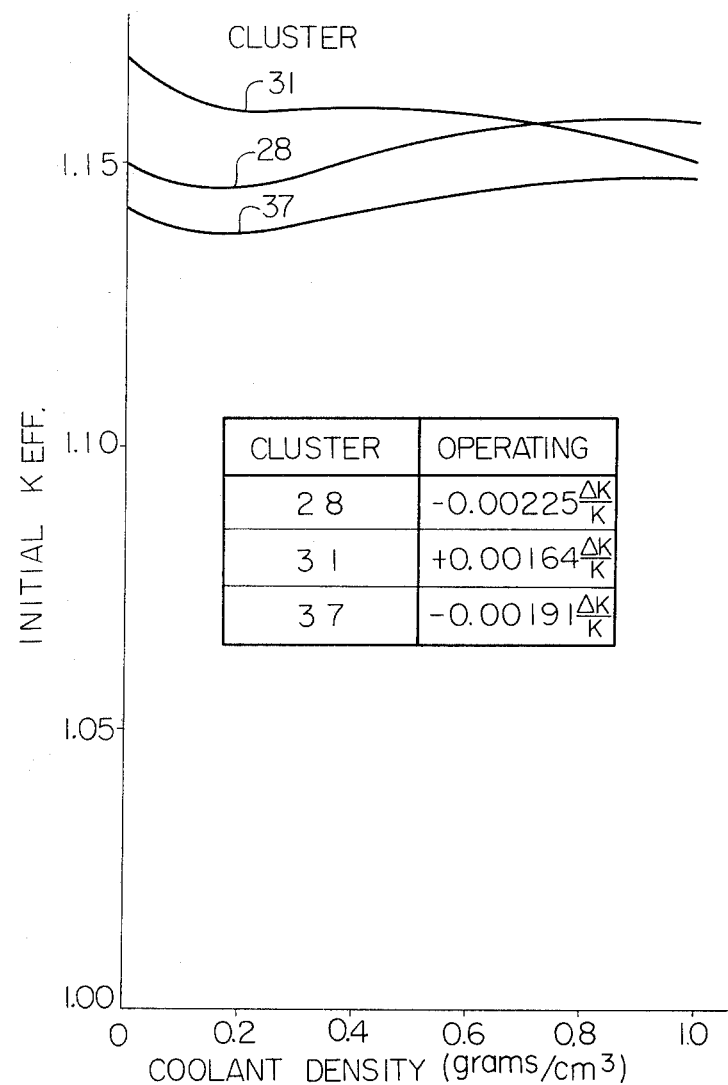
FIG. 3 shows the void reactivities for the cluster containing various numbers of fuel rods.
Figure 4:
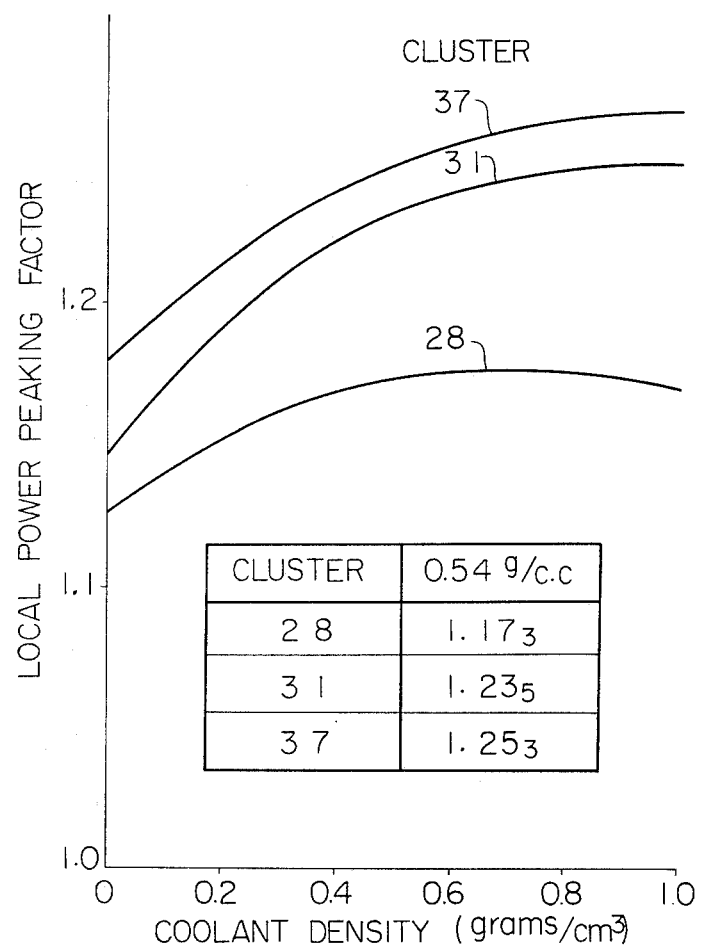
FIG. 4 shows the local power peaking factors of the present clusters each of which contains a different number of fuel rods.

FIGS. 2, 3 and 4 show respectively comparative data in the case where in the number of rods in each cluster is varied (clusters containing 23, 31 and 37 rods being specifically shown) on and after the second loading of fuel. The fuel material used in these rods is natural uranium dioxide mixed with plutonium dioxide.

FIG. 2 shows data of fuel burn-up for the secondary loaded fuel cluster in which a more increased number of fuel rods compared with the previously described embodiment are inserted. In obtaining this data, the pressure tube with same size was used throughout this experiment. Slightly enriched uranium dioxide fuel pellets each of 14.50 – 15.50 millimeters in diameter (28 fuel rods) were used for the first fuel loading. Fuel pellets each of 12.94 – 13.87 millimeters in diameter (37 fuel rods) of natural uranium dioxide mixed with plutonium dioxide were used on and after the second fuel loading. In FIG. 2, numerals 28, 31 and 37 show the number of the fuel rods in a cluster, respectively. It is clear from this figure that the burn-up for the cluster containing 28 fuel rods corresponds to 14747 MWD/TU and that of the cluster containing 37 fuel rods corresponds to 13953 MWD/TU, showing the former to be superior to the latter, and the latter be somewhat superior to that for the cluster containing 31 fuel rods. (The above numerical data are those at a coolant density of about 0.54 gr/cm$^3$ which is a typical coolant condition or the value in operation of the nuclear reactor in practice.)

FIG. 3 shows the comparison of the void reactivities for clusters containing various number of fuel rods. In this experiment, it is clearly shown that when the coolant density is selected at about 0.54 gr/cm$^3$, the clusters containing 28 fuel rods and 37 fuel rods show the negative void reactivity, and those are considered to be suitable for controlling the nuclear reaction at a safe level. Further this data shows that when the operating condition is selected such that the coolant density becomes between 0.54 – 0.74 gr/cm$^3$, the cluster containing 28 fuel rods has a negative void reactivity of $-0.00225$ $\Delta$ k/k and the cluster containing thirty-seven fuel rods has $-0.00191$ $\Delta$ k/k. The latter is the nearest to zero reactivity coefficient and produces more advantage in power response than the former. On the other hand, the cluster having 31 fuel rods has a positive void reactivity and thus the worst safety characteristics of these three clusters.

FIG. 4 shows the local power peaking factors of these three clusters against the coolant density, and, from those data, it will be noted that a power output of about 1.22 times as much as the rated power output of the cluster having 28 fuel rods can be obtained by the cluster containing 37 fuel rods. In practice, at the rated power condition, the power output in the hottest channel of the cluster having 28 fuel rods was 3.09 MW and that of the cluster containing 37 fuel rods was 3.78 MW.

As described above, when a cluster containing 37 fuel rods with the mixed oxide fuel is used, the fuel burn-up is slightly low in comparison with that of 28 fuel rods cluster however, the void reactivity of this cluster becomes negative and it gives a superior power transient with respect to that of 28 fuel rods cluster. Furthermore, the power density of a 37 fuel rods cluster is increased by 20 per cent more than that for the cluster of 28 rods. The effect, i.e., the increase of channel power output of such degree, is very significant in power economy.

What is claimed is:

1. A method of operating a pressure-tube type, heavy-water moderated, light-water cooled nuclear power reactor, said method consisting essentially of, (a) initially loading into pressure tubes of a core of said reactor, a plurality of fuel clusters each containing a number of fuel rods, said rods each comprising slightly enriched uranium dioxide and having a first diameter; (b) operating said reactor using the initially loaded rods; (c) removing rods from said reactor after a period of operation; (d) reprocessing removed rods to extract plutonium and remaining uranium dioxide and preparing the same number of fuel rods initially loaded, said same number of fuel rods each containing uranium dioxide and plutonium dioxide and having a second diameter smaller than said first diameter; (e) inserting rods having said second diameter into pressure tubes of said reactor core; and (f) operating said reactor using rods having said second diameter.

2. A method of operating a pressure-tube type, heavy-water moderated, light-water cooled nuclear power reactor, said method consisting essentially of, (a) initially loading into pressure tubes of a core of said reactor, a plurality of fuel clusters each containing a number of fuel rods, said rods each comprising slightly enriched uranium dioxide and having a first diameter; (b) operating said reactor using the initially loaded rods; (c) removing rods from said reactor after a period of operation; (d) reprocessing removed rods to extract plutonium and remaining uranium dioxide and preparing fuel rods each containing uranium dioxide and plutonium dioxide and having a second diameter smaller than said first diameter; (e) inserting rods having said second diameter into pressure tubes of said reactor core, the number of fuel rods in each cluster of the second inserting being larger than the number of the fuel rods in each cluster of said initial loading; and (f) operating said reactor using rods having said second diameter.

3. The method of claim 2, wherein each cluster of the initial loading comprises 28 fuel rods, each cluster of said subsequent loadings comprises 37 fuel rods, the diameter of said slightly enriched uranium dioxide fuel rods is 14.50 – 15.50 millimeters and the diameter of said mixed oxide fuel rods is 12.94 – 13.87 millimeters.

* * * * *